United States Patent [19]
Sykes

[11] Patent Number: 5,486,041
[45] Date of Patent: Jan. 23, 1996

[54] CABINET STRUCTURES COUPLED TO ADJACENT CABINET STRUCTURES AND TO RECTANGULAR FRAME ELEMENTS, AND EQUIPPED WITH ANTI-TILT MECHANISMS AND ROLLING AND SLIDING BASES

[75] Inventor: Christopher C. Sykes, Toronto, Canada

[73] Assignee: International Fuel Cells Corporation, South Windsor, Conn.

[21] Appl. No.: 249,606

[22] Filed: May 26, 1994

[51] Int. Cl.⁶ ............................................. F16B 12/10
[52] U.S. Cl. ...................... 312/111; 312/198; 312/263; 312/108
[58] Field of Search ........................ 312/108, 111, 312/198, 263, 265.5; 108/64, 65; 248/188.4

[56] References Cited

U.S. PATENT DOCUMENTS

| | | | |
|---|---|---|---|
| 2,675,287 | 4/1954 | Sitler | 312/111 |
| 2,708,292 | 5/1955 | Budai | 312/111 |
| 2,746,109 | 5/1956 | Budai | 312/111 |
| 2,824,775 | 2/1958 | Sitler | 312/111 |
| 3,403,641 | 10/1968 | Baker | 312/111 X |
| 3,746,416 | 7/1973 | Sasnett et al. | 312/198 |
| 3,749,465 | 7/1973 | Newcomer | 312/263 |
| 4,560,257 | 12/1985 | Otema | 312/108 X |
| 4,591,289 | 5/1986 | Vickers et al. | 108/64 X |
| 4,619,486 | 10/1986 | Hannah et al. | 312/198 X |
| 4,650,263 | 3/1987 | Monaghan et al. | 312/108 X |
| 4,905,428 | 3/1990 | Sykes | 52/126.4 |
| 4,991,805 | 2/1991 | Solak et al. | 248/188.4 |
| 5,062,246 | 11/1991 | Sykes | 52/126.4 |
| 5,328,260 | 7/1994 | Beirise | 312/108 X |
| 5,350,227 | 9/1994 | Katz | 312/111 X |

FOREIGN PATENT DOCUMENTS

WO91/13221  9/1991  WIPO.

Primary Examiner—Kenneth J. Dorner
Assistant Examiner—Rodney B. White

[57] ABSTRACT

Cabinet structure has interconnected side, top and back panels, and base structure connected to the side panels, all with interengaging bevelled edge surfaces. A recess is formed in one bevelled surface and extends outwardly to define an opening on an outer corner edge of the cabinet structure. A coupling member has a rectangular tab inserted in the opening for coupling to auxiliary structure. The base structure is a channel rail receiving a plate sliding longitudinally of the rail from a retracted position to an extended position for engaging in the rail of said similar structure. Sliding drawer suspensions have anti-tilt mechanisms interconnected by an actuating bar which passes through the top panel of the lower of two stacked cabinet structures. The bar is releasably connected to each anti-tilt mechanism to allow assembly and disassembly of the stack. A rectangular base has rollers and a jacking member to raise the base from a lower position in which it rolls freely on the rollers to an upper position in which the rollers disengage from the ground.

14 Claims, 15 Drawing Sheets

CABINET STRUCTURES COUPLED TO ADJACENT CABINET STRUCTURES AND TO RECTANGULAR FRAME ELEMENTS, AND EQUIPPED WITH ANTI-TILT MECHANISMS AND ROLLING AND SLIDING BASES

The present invention relates to cabinet structure especially although not exclusively useful for office furniture.

In the current economic climate, there is considerable demand for furniture, especially office furniture, which can be manufactured relatively inexpensively from relatively low cost materials and which functionally is at least equal to and preferably superior to conventional designs. One area in which known designs tend to be deficient however is in providing arrangements for attachment or coupling to adjacent or auxiliary structure. For example it may be desired to couple a cabinet or bank of cabinets parallel to or at right angles to a wall or partition structure. Further it may be desired to employ modular cabinet structure which can be readily coupled to or disconnected from vertically or transversely adjacent similar cabinet structures allowing for the provision of cabinet storage capacity of desired size and for increase or reduction of such capacity in response to changes in the demand locally in the office or other environment in which the structure is used. The known cabinet structures and the arrangements for providing such coupling tend to be more complex and expensive and more difficult to install and operate than may be considered desirable.

Moreover, known cabinet drawer structures of which the applicant is aware have not been stackable on one another without problems of tilting of the cabinets arising if an excessive number of drawers are opened at the same time.

In one aspect the present invention provides cabinet structure adapted to be coupled to auxiliary or other adjacent structure, comprising interconnected side, top and back panels, and base structure connected at least to the side panels. The side and top panels have interengaging bevelled edge surfaces, and at least one channel section recess is formed in at least one of said bevelled edge surfaces and extends outwardly to define an opening on an outer corner edge of the cabinet structure. In combination with the cabinet structure there is provided a coupling member having a rectangular tab portion adapted to be inserted in said opening and to be coupled to an adjacent structure.

With this arrangement the cabinet structure may be manufactured relatively inexpensively from panels machined from particle or fibre board or the like and having the channel section recess or recesses machined in their edge surfaces. The panels may be interconnected by angle bracket connectors, preferably inserted into slots machined into the bevelled edge surfaces at zones spaced between the side faces of the panels so that the connectors are not visible from the outside or from the inside of the cabinet. The coupling member may be adapted to couple to vertically adjacent cabinet structure or to partition structure extending parallel to or at right angles to the cabinet structure, for example. By virtue of the inclination of the recess in which the tab portion is inserted an anchorage or connection is achieved which provides resistance to vertical as well as lateral forces without requiring the use of additional mechanical fasteners.

In a further aspect the invention relates to cabinet structure adapted to be attached laterally to similar structure and comprising side, top, and back panels and base structure connected at least to the side panels. The base structure comprises at least one channel section rail extending laterally between the side panels and receiving a plate sliding longitudinally of the rail from a retracted position to an extended position engaging in the rail of said similar structure. This arrangement provides a relatively simple and inexpensive means of interconnecting laterally adjacent cabinet structure to provide a group or wall of cabinet having increased stability. Preferably the channel section rail is an extrusion, for example of aluminum or engineering plastic material and is extruded or otherwise formed with a bevelled longitudinal edge and is formed with bevelled end surfaces, for example by cutting the extrusion along planes inclined to the general plane of the channel so that it is well adapted to be incorporated in a cabinet structure formed from bevel edged panels as described above.

The invention also provides modular sliding drawer cabinet structure comprising at least an upper and a lower modular cabinet adapted to be stacked vertically with said upper on said lower cabinet, each cabinet having two sides, a back, a top and base structure, each side having an inner face, and a front connected to a sliding drawer suspension connected to each of said inner faces, an anti-tilt mechanism associated with at least one sliding drawer suspension of each cabinet, and an actuating bar interconnecting the anti-tilt mechanisms and disallowing extension of the suspension of one of said cabinets when the suspension of the other of said cabinets is extended, and wherein the top of at least the lower cabinet has an opening through which the bar passes and each end of the bar is adapted to couple releasably to each anti-tilt mechanism.

The invention will now be more fully described by way of example only with reference to the accompanying drawings.

Figure 1:
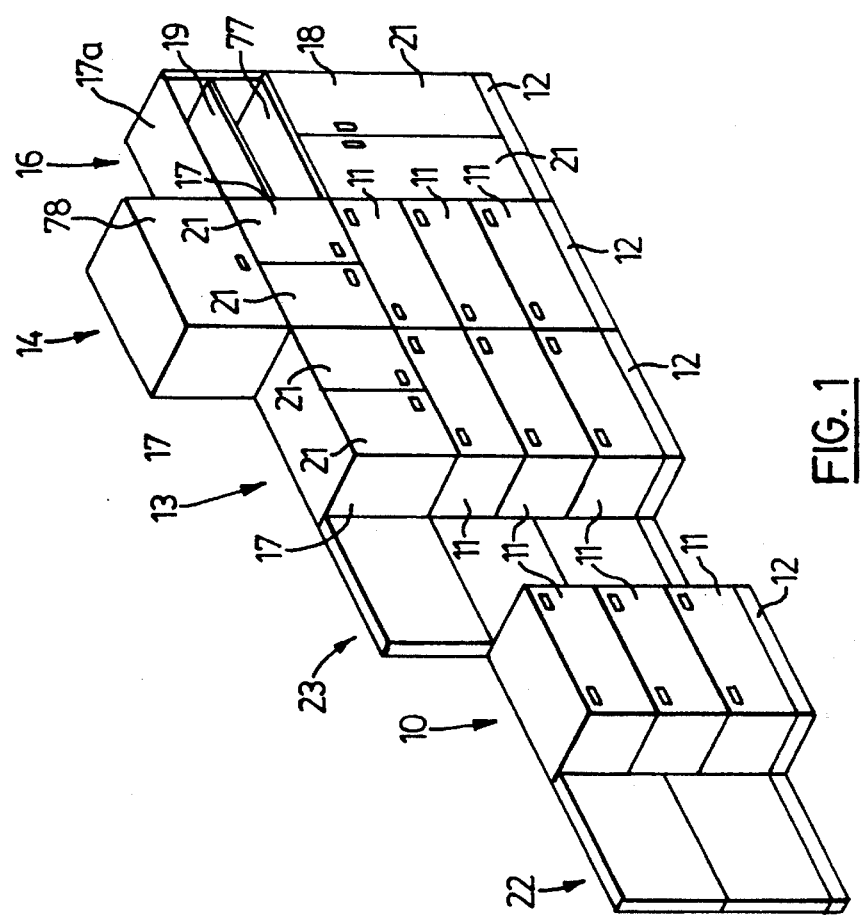
FIG. 1 is a perspective view of cabinet structure in accordance with the invention used in association with partition structure.

Referring to the accompanying drawings, wherein like reference numerals indicate like parts, FIG. 1 shows banks of cabinets formed from vertically and/or horizontally adjacently placed modular units of cabinet structure in accordance with the invention. Such cabinet structure may be free standing or as shown may be coupled to partition units.

More particularly, FIG. 1 shows a first cabinet group 10 formed from three vertically adjacent modular cabinet structures 11 placed on a supporting base 12. Second, third and fourth groups 13, 14 and 16 are placed horizontally adjacent one another. Groups 13 and 14 each comprise three of the structures 11, and a somewhat taller structure 17. Group 14 includes a further structure 17 placed on top. Group 16 comprises a still taller structure 18, surmounted by a unit 17a similar to structure 17 except it is provided with open shelving 19 rather than cabinet doors 21. Each group 13, 14 and 16 is placed on a supporting base 12.

The cabinets are shown incorporated into a partition wall comprising elements 22 and 23 as described and shown in applicant's U.S. patent application Ser. No. 08/173,257 filed Dec. 27, 1993 and U.S. Pat. No. 4,905,428 dated Mar. 6, 1990, the disclosures of both of which are incorporated herein by reference. It may be noted that the cabinet structures 11, 17 and 18 and bases 12 are modular with respect to the elements 22 and 23, so that, for example, the three cabinets 11 plus supporting base 12 have the same height as the two-high partition structure 22 including its supporting base, while structure 17 has the same height as one panel of element 23. Structure 18 has the same height as the two high partition 22 or three of the cabinet structures 11.

Preferably, each structure 11, 17 and 28 is equal in width to an element 22 or 23.

Figure 2:
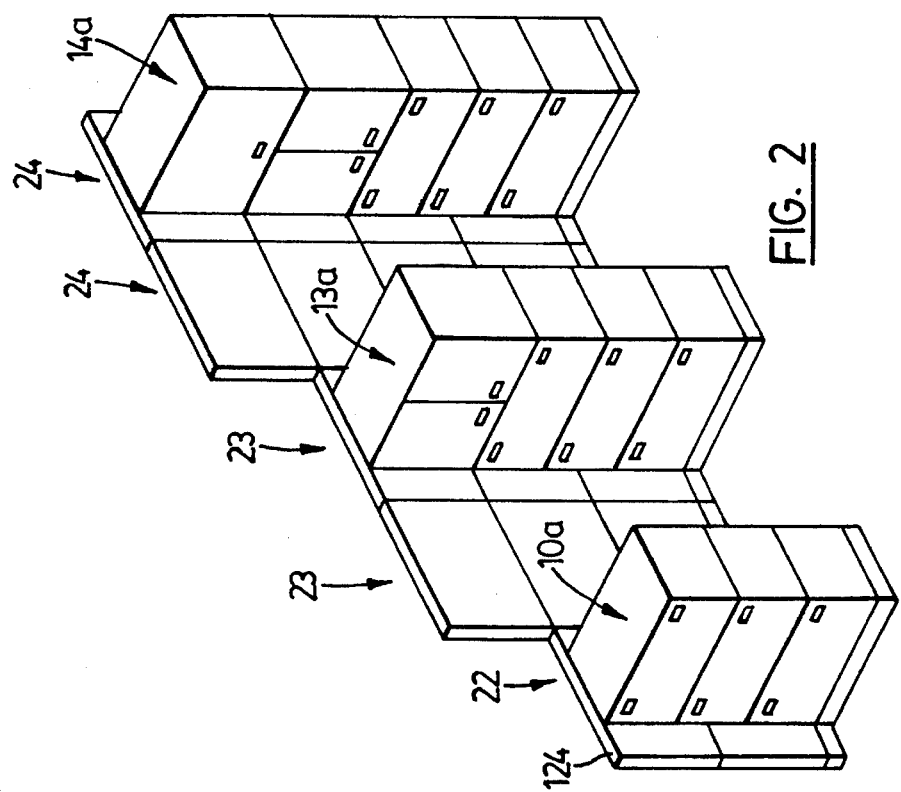
FIG. 2 is a perspective view of a further arrangement of cabinet structure of the invention with partition structure.

FIG. 2 shows groups 10a, 13a and 14a similar to groups 10, 13 and 14 and coupled at right angles to a partition formed by a linear run of a two high unit 22, two three high units 23, and two four high units 24.

Figure 3:
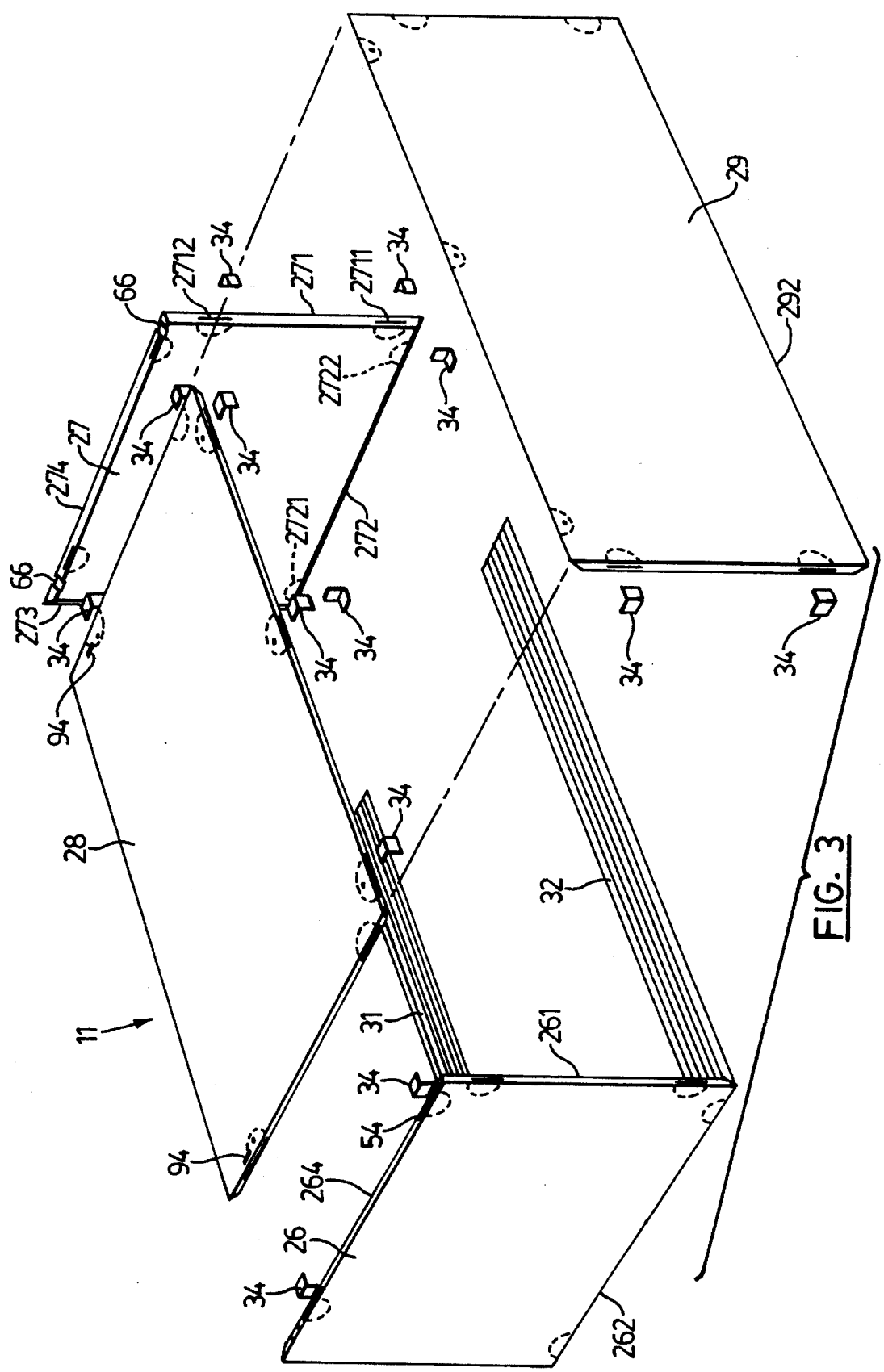
FIG. 3 shows a view from the rear, in exploded form, of the components of cabinet structure in accordance with the present invention.

FIG. 3 shows in exploded form a cabinet structure in accordance with the invention having the proportions of the cabinet structure 11 described above. The same principles of construction are however equally well used for producing the cabinets 17, 17a or 18 referred to above and other similar cabinet structures. The structure in FIG. 3 has opposing side panels 26 and 27, a top panel 28 and a back panel 29. Each panel is preferably of uniform and equal thickness. The cabinet also comprises a base structure comprising two lengths of rail structure 31 and 32. Each of the pieces 31 and 32 is a length severed from an extruded rail of the profile shown at 33 in FIG. 4.

The panels 26 to 29 may be formed of any board-like sheet material providing adequate strength properties, and which preferably is readily machined using routing devices and the like, so that its edges can be readily shaped and profiled. Examples of suitable materials include wood, chipboard and various other particle board and fiber board materials well known to those of skill in the art and typically formed from bonded wood or other cellulosic particle or fiber products. A preferred material is MDF (medium density fiber board).

As seen in the accompanying drawings, in the preferred form each side edge of each of the panels 26 to 29 is inwardly bevelled, usually at 45° to the main faces. Each panel forms a miter with each adjoining panel. The back panel 29 forms a miter with each side panel 26 and 27 and with the top panel 28. In bevelled edge surfaces which interengage in the assembled cabinet structure with an adjacent bevelled edge surface of a panel, or with an end of a rail 31 or 32, such surfaces are formed, for example by routing, with a recessed slot-like pocket best seen in, for example FIG. 3 wherein a bevelled rear edge 271 is formed with a routed pocket 2711.

The accompanying drawings use the reference numeral notation of a suffix 1 to 4 to indicate the bevelled edges of the corresponding panels. One bevelled edge of the side panel 27 is indicated by reference numeral 271, a second bevelled edge by reference numeral 272, etc. Further, the drawings use the reference numeral notation of addition of a suffix 1 or 2 to the bevelled edge reference numeral to indicate a routed slot or pocket formed in that edge. Thus, for example, one routed pocket in the edge 271 is identified by reference numeral 2711 and the other by 2712, etc. The extent of the routed pocket within the panel is indicated approximately in broken lines in FIGS. 1, 3 and 4.

Figure 4:
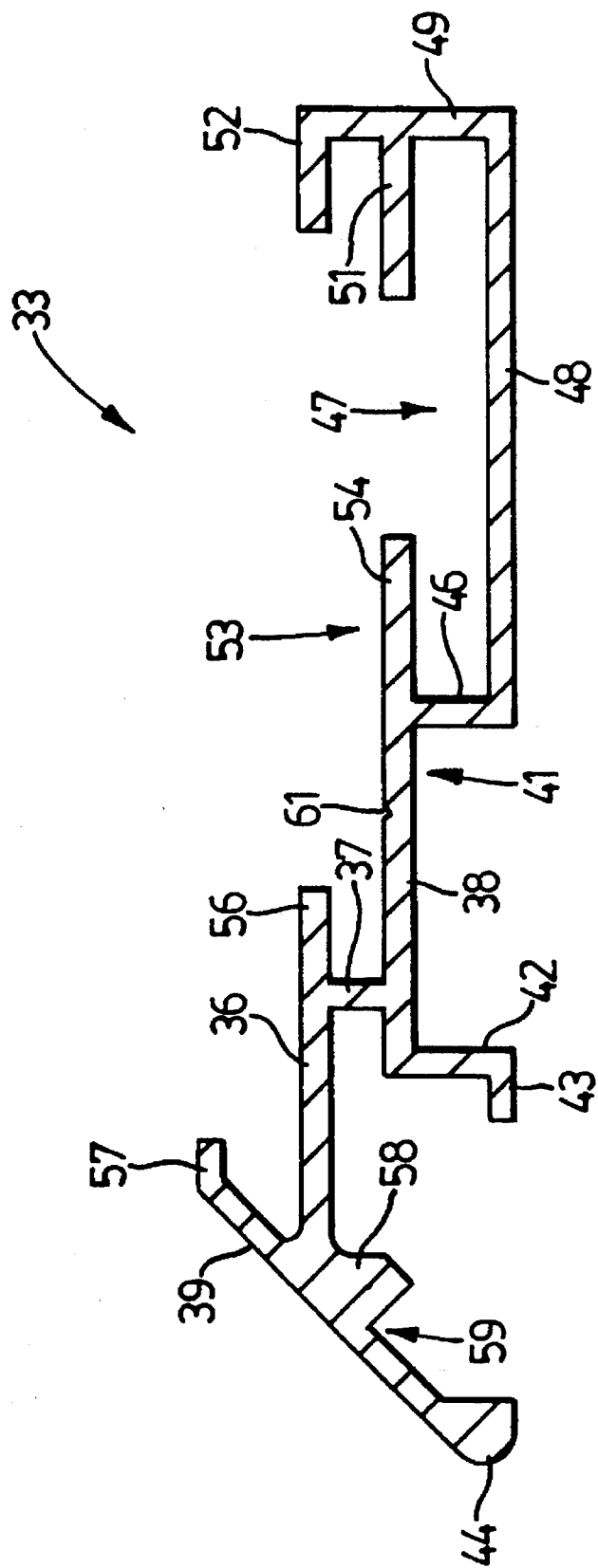
FIG. 4 shows a cross-section on an enlarged scale of a channel section rail employed in the cabinet structure of FIG. 1.

As best seen in FIGS. 3 and 4, the pockets are formed to snugly receive the arms of angle bracket connectors 34.

As may best be understood by reference to FIG. 3, in the assembled condition of the structure 11, a pair of such angle bracket connectors 34 connect each side 26 and 27 to the top 28, a further pair connect each side 26 and 27 to the rails 31 and 32, and further pairs connect the sides 26 and 27 to the back 29. Usually, a set of three of the connectors 34 connect the top edge of the back 29 to the rear edge of the top 28.

As will be readily appreciated, in assembling the cabinet structure, a set of the connectors 34 may be preinserted into the pockets routed in the bevelled edges of a panel and then each panel having the connector members 34 inserted therein may be manipulated to introduce the protruding ends of its connectors 34 into the routed pockets in the edges to which the panel is to be joined.

The channel section rail 33 from which the lengths 31 and 32 are severed, as seen in FIG. 4 comprises a main planar web portion 36 having a downwardly depending flange 37 to which connects a secondary planar web portion 38. The front edge of the web portion 36 carries an inclining portion 39 presenting a bevelled surface for interengagement with a bevelled lower edge surface 292 of, for example, the back panel 29. The secondary web portion 38 defines the base of a downwardly facing channel 41 having a channel side portion 42 extending laterally forward to define a foot portion 43 extending in a third or lower most base plane. The lower edge of the front portion 39 has a thickened foot portion 44 having its lower surface coplanar with the plane of the foot portion 43. Further, rearwardly, the web 38 is provided with a downwardly extending flange 46 forming an opposite side of the downwardly facing channel 41 and one side of a lower upwardly facing channel 47. The flange 46 connects with a lower base web 48 extending coplanar with the foot portion 43 and thickened portion 44 toward a rear upwardly extending flange 49 having forwardly directed web portion 51 and 52 defining re-entrant edges of the lower upwardly facing base channel 47 and of an upper upwardly facing channel 53. The upper channel 53 is intended to receive a limb of the connectors 34 inserted endwise therein. Web portions 54 and 56 extending rearwardly from the webs 38 and 36, respectively, define opposing re-entrant channel side portions of the channels 47 and 53.

Further, it may be noted that the inclining front portion 39 extends upwardly above and usually at 45° to the plane of the web 36 and horizontally inwardly to define a rearwardly directed lip portion 57. On its underside, the portion 39 includes a thickened rib 58, the lower edge of which defines with the underside of the portion 39 a downwardly facing angular section groove 59, which may be used to locate the tip of self-tapping screws threaded upwardly through the portion 39 to engage, if desired, in a lower bevelled edge such as edge 292 of the back panel 29 engaging the portion 39 in the completed cabinet structure. The effective thickness of the rail 33, that is the distance between portions 44 and 57 is preferably the same as the thickness of each of the panels 26 to 29.

The upper face of the secondary web portion 38 is extruded with a small V-section groove 61 to serve as a guide for cutting or tapping holes through the web portion 38, as described in more detail later.

The rail 33 is preferably extruded from a metal, such as aluminium, but may be extruded from a high strength engineering plastic such as nylon, NOREL® or the like, if desired.

Figure 6:
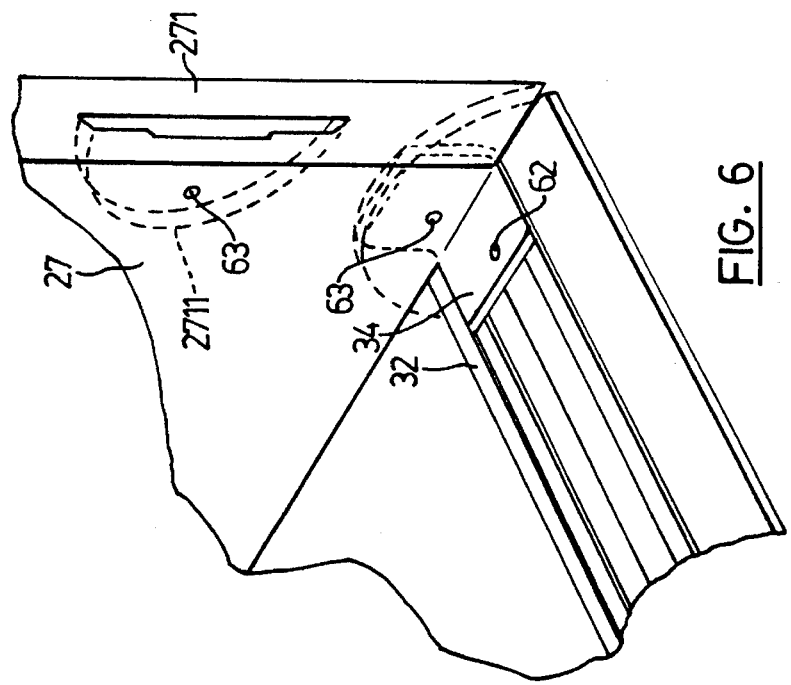
FIG. 6 is a partial perspective view similar to FIG. 3, showing the elements in interconnected position.
Figure 5:
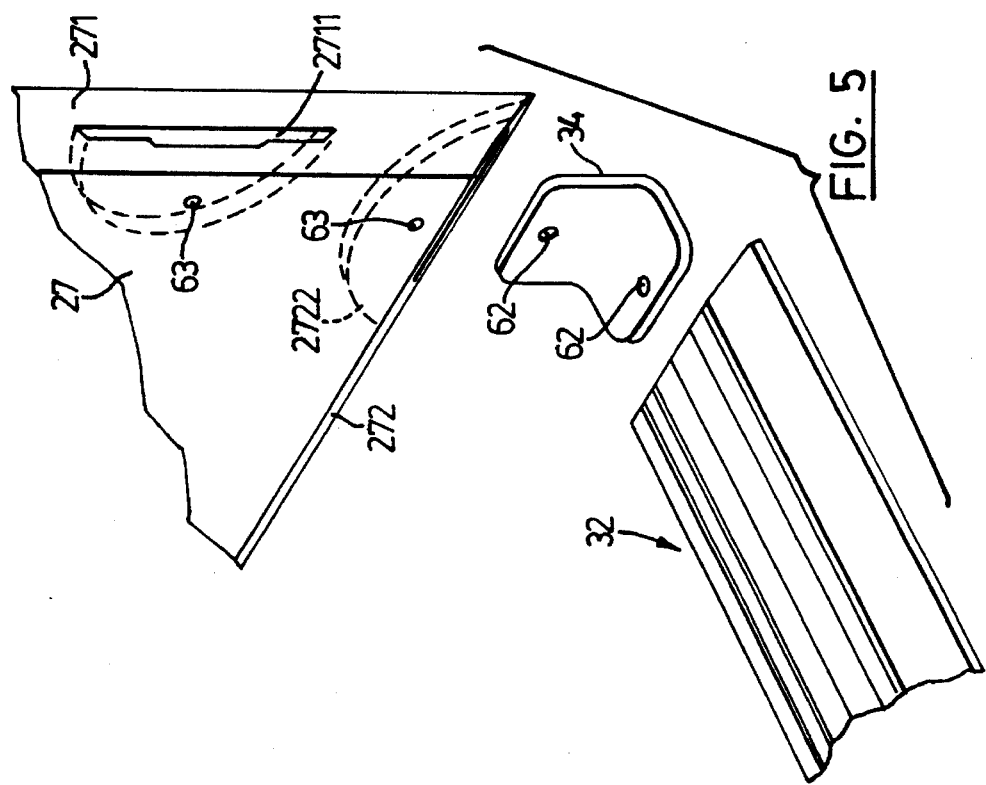
FIG. 5 is a partial perspective view showing a connection between a side panel and a base rail structure adjacent a rear corner of the cabinet structure.

In forming the pieces 31 and 32, the rail 33 is cut to lengths with the ends bevelled downwardly and outwardly to mate snugly with the lower bevelled edges 262 and 272 of the side panels 26 and 27, respectively. As seen in FIGS. 5 and 6, angle bracket connector 34 are inserted endways into the upper upwardly facing channel 53 in the rails 31 and 32 and into the corresponding routed pockets such as the routed pocket 2722 in the side panel 27 are used to connect the ends of the rail 31 and 32 to the side panels 26 and 27.

It may be noted that, in assembling the cabinet structure, the rails 31 and 32 are oppositely directed, with the inclining surface 39 of the front rail 31 facing forwardly to blend with the adjacent forward bevelled edge surfaces of the side panels 26 and 27 and the inclining face 39 of the rear rail 32 facing rearwardly to mate with the bevelled edge surface 292 of the back panel 29 as well as to blend in miter fashion with the adjacent bevelled edges 261 and 272 of the side panels 26 and 27.

In the preferred form, the connector members 34 are each formed with a small circular hole 62 adjacent the mid-point of each limb. Similarly, the panels 11 to 14 are formed with small circular holes 63 in portions overlying the routed pockets 2711, etc. in registry with the holes 62 in the connectors 34 when fully inserted into the routed pockets. After completion of the assembly of the cabinet structure, screws 64 (see FIG. 7) are passed through the holes 63 or directly into the connectors 34 to engage the holes 62 in the connectors and embed in the material of the panels 26 to 29, in order to locate the connectors 34 within the routed pockets 2711 etc. and secure the elements of the assembled cabinet structure together.

In the case of the connectors 34 inserted in the rails 31 and 32, self-tapping screws 64 may be passed through the holes 62 in the exposed limb of the connector lying in the channel 53. It may be noted that the re-entrant flange 54 is off-set rearwardly from the mid-point of the upper channel 53 into which the connectors 34 are inserted, in order to provide material in which the screw may embed.

The elements of the cabinet structure described above with reference to FIGS. 3 to 7 are well adapted to be produced by automated, computer-controlled cutting and routing machinery. As will be appreciated by those skilled in the art, it is readily possible to provide automated machinery to which board stock of the material from which the panels are to be formed may be fed and to which continuous lengths of the extrusion 33 may be fed. Such automated machinery may cut the boardstock to the required sizes and shapes, rout its edges to provide the bevelled edge structure and rout the pockets 2711, etc. automatically. Further, such machinery may automatically cut the extrusion 33 to the lengths required to form the base structure rails 31 and 32, and form bevelled ends on the rails.

As will be appreciated, often it will be desired to provide cabinet structures of standard or uniform depth and of one or more standard lengths and of several standard heights, so that cabinet structures of different dimensions are modular with respect to one another, and may be combined together to form a unitary wall or bank of cabinets as described above with reference to FIGS. 1 and 2. The automated machinery described above is readily programmable to provide components of various standard sizes which may be connected together, using front and rear rails similar to the rails 31 and 32, and the connectors 34, to form the above-mentioned standard range of cabinet sizes. Non-limiting examples include the structures 11, 17 and 18 referred to above. Moreover, such machinery may form the panels and their bevelled edges (usually at 45° to the major faces of the panels) and routed pockets, and provide the cut lengths of rails such as the rails 31 and 32 and their bevelled ends, to a dimensional accuracy which would not normally be obtainable except by employing the most highly qualified and skilled craftsmen.

Figure 7:
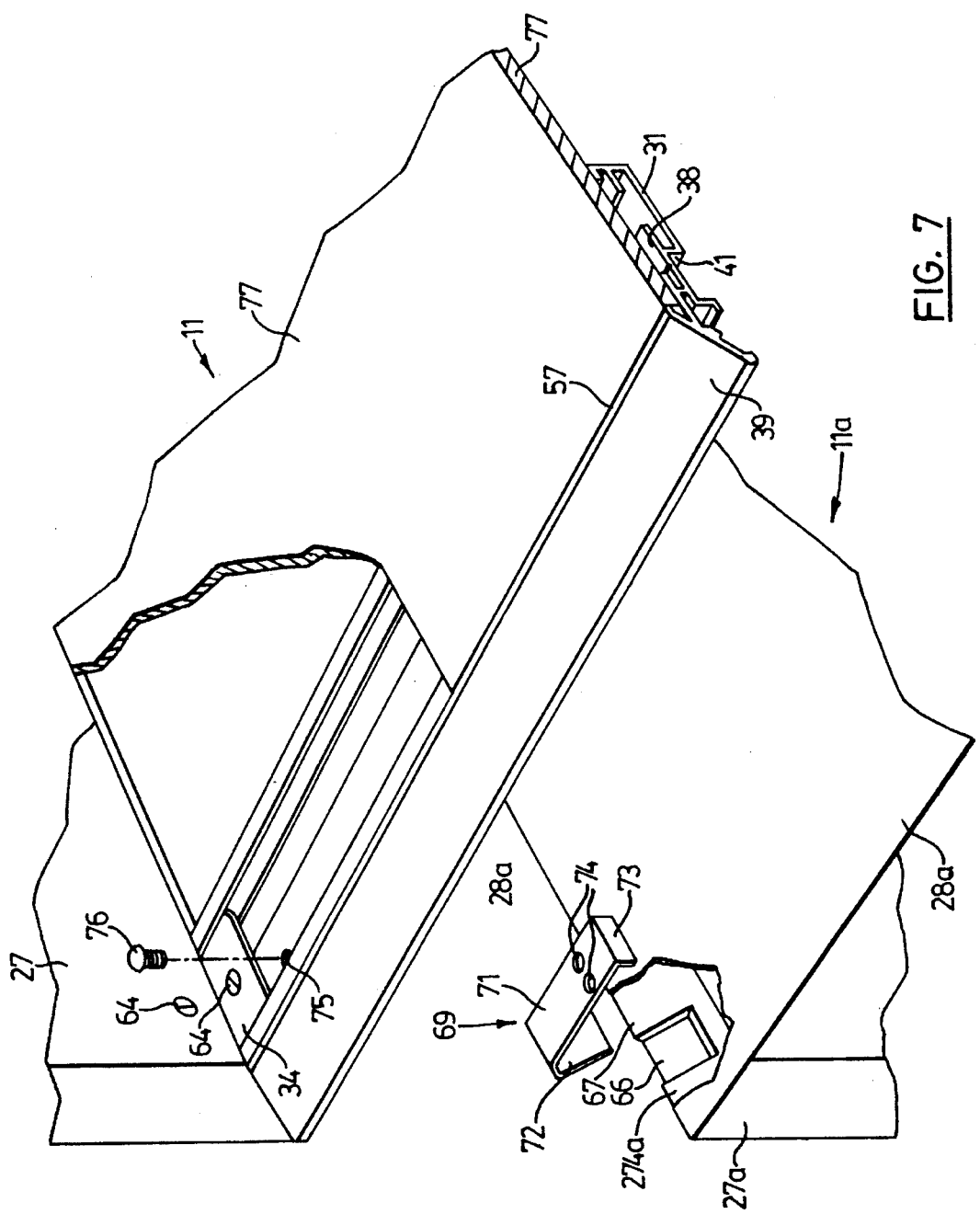
FIG. 7 is a partial perspective view with portions cut away to show interior structure and showing an arrangement for coupling a cabinet to a vertically adjacent similar cabinet structure.
Figure 8:
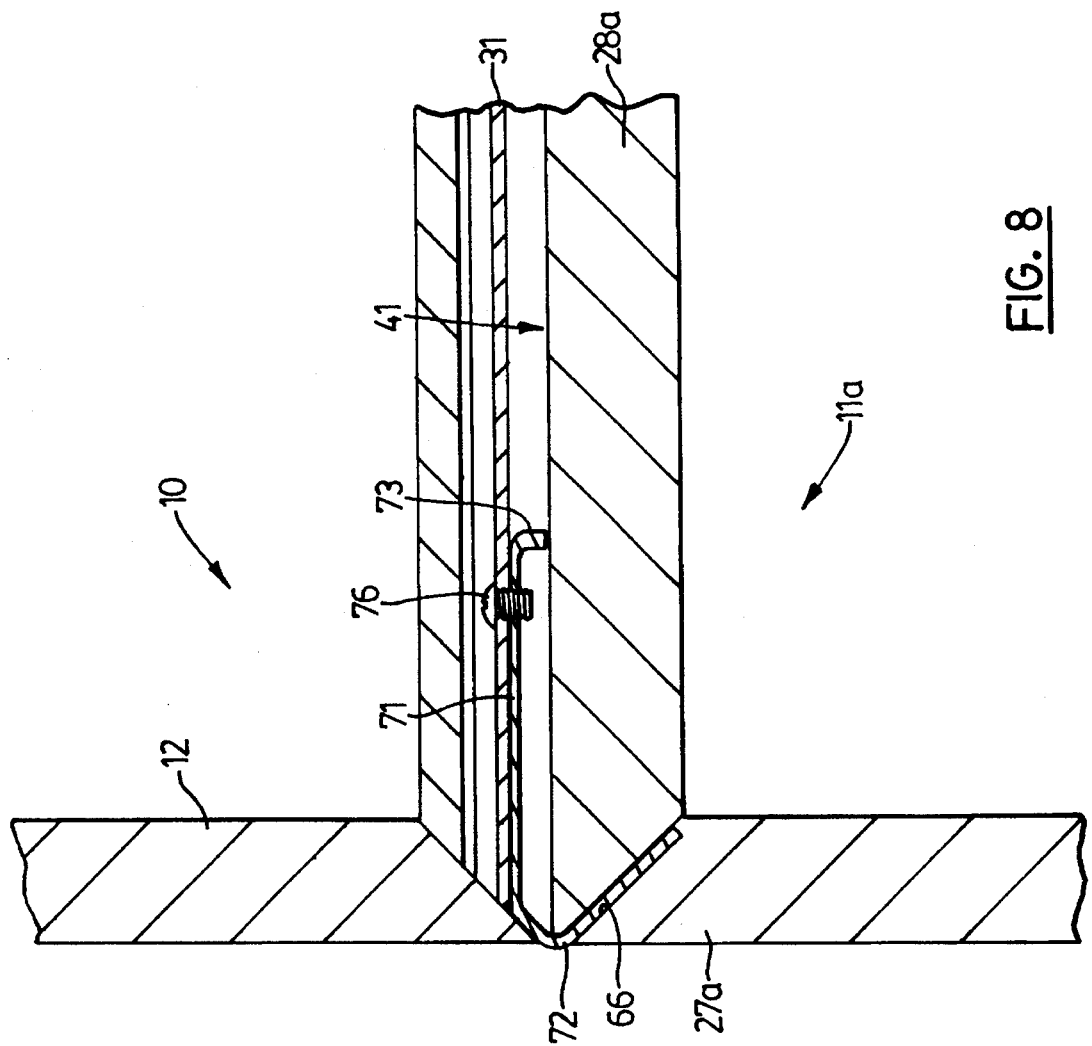
FIG. 8 is a partial cross-section showing the coupling element of FIG. 7 in assembled position.

Referring to FIGS. 3, 7 and 8, the upper bevelled edge surfaces 264 and 274 of the side panels 26 and 27 are provided with a pair of shallow channel section recesses 66, one adjacent the front and one adjacent the rear of the panel. One of these recesses 66 is best seen in FIG. 7, which shows a cabinet structure 11 to be coupled to a lower adjacent cabinet structure 11a. Parts similar to those of the structure 11 are denoted by the same reference numerals with suffix a. As best seen in FIG. 7, each shallow recess 66 extends a distance inwardly from the outer corner edge 67 of the bevelled face 274a in which the recess 66 is formed. The recesses 66 are readily adapted to be automatically routed into the edges of the panels in the course of the automated fabrication procedure described above.

Figure 16:
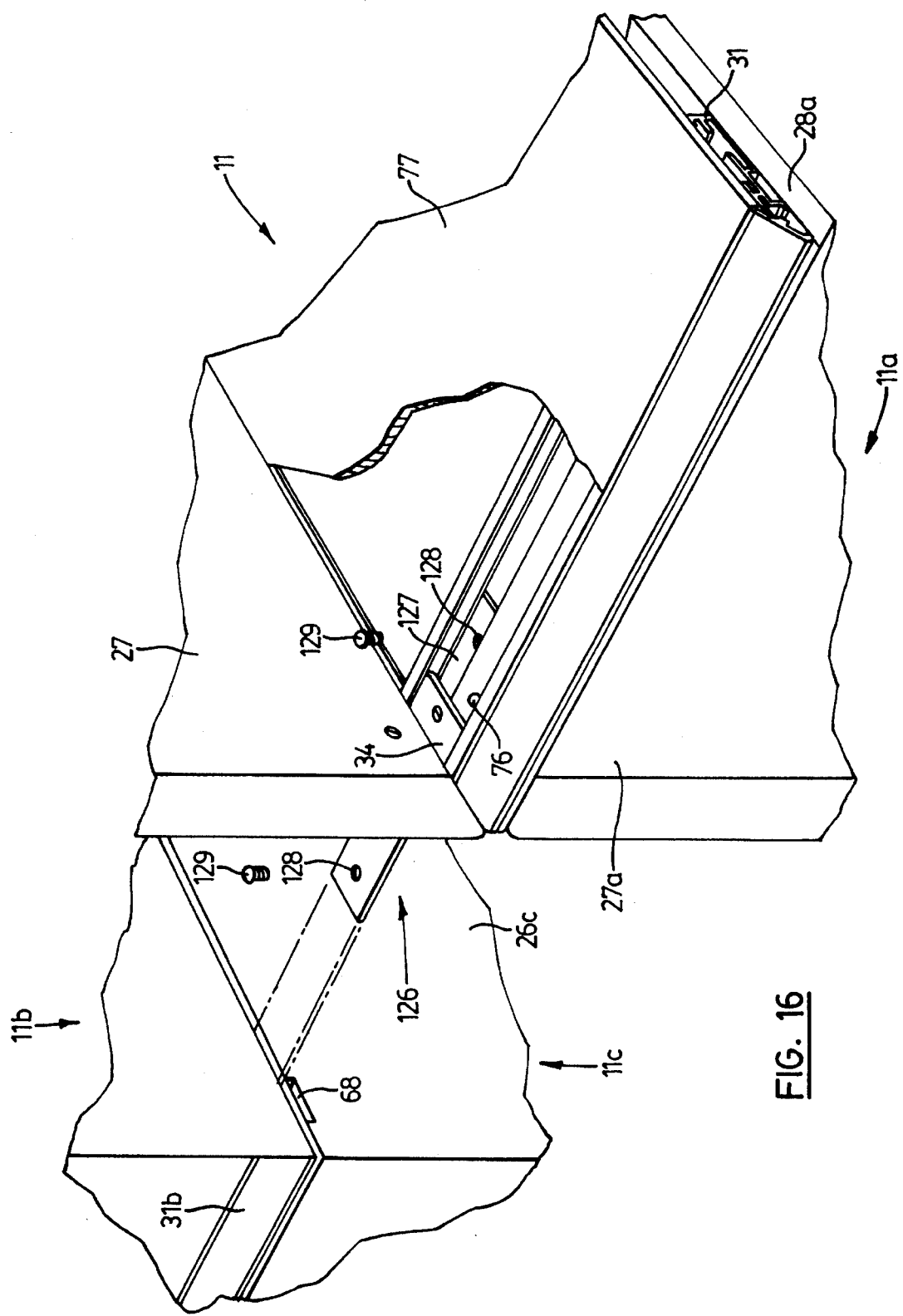
FIG. 16 is a partial perspective view, again with portions cut away, showing an arrangement for laterally connecting the cabinet structure to similar cabinet structure.

In the assembled cabinet structure, when the top panel, for example panel 28a, is united to the side panel 27a, the recess 66 defines with the adjacent bevelled edge surface of the top panel 28a a slot or opening, as may be seen at 68 in FIG. 16 in a laterally adjacent similar cabinet structure 11c. The recess 66 and opening 68 may be used in a variety of ways in combination with coupling devices for coupling the cabinet structure to auxiliary structures such as partition walls and vertically adjacent cabinet structure, as well as to similar cabinet structure. Such coupling elements comprise a rectangular tab portion which fits snugly within the opening 68 and recess 66. By virtue of the inclination of the recess 66, the engagement of the tab portion within the recess can provide an engagement or anchoring which offers good resistance to vertically-directed as well as lateral forces.

In FIG. 7 and 8, for example, there is employed a coupling element 69 for use in connecting vertically adjacent cabinet structures together, such as structures 11 and 11a. The element 69 comprises a rigid rectangular strip 71, preferably of steel, of a width which fits snugly within the downwardly facing channel 41 of rails 31 and 32. An end 61 is bent outwardly and then inwardly downwardly at an angle of approximately 45° to the strip 71, as seen in FIG. 8, and an opposite end 73 is bent over to form a limb extending toward and engaging the upper surface of a top panel 28a of a sub-adjacent cabinet structure 11a. In use, the tab portion 72 is inserted into the opening 68 and recess 66, and the upper cabinet structure 11 is then placed over the lower structure 11a in a position such that the strip 71 enters the downwardly facing channel 41. The strip 71 is formed with a pair of holes 74, one of which in the inserted position is in registry with a hole 75 predrilled through the web portion 38 at a point along the V-groove 671 in the rail 38. A hole 75 is pre-drilled through each of the rails 31 and 32 adjacent each end. Since, as seen in FIG. 4, the groove 61 is off-set from the median line of the downwardly facing channel 41, one of the holes 74 will be in registry with a hole 75 when an element 69 is inserted into the one end of the rail 31 or 32, while the other of the holes 74 will be in registry with a hole 75 at the opposite end of rail 31 or 32 in the case of a coupling element 69 inserted into the opposite end of the rail 31 or 32. In order to secure the rail 31 to the element 69, a screw 76 is inserted through the hole 75 and threads into the a hole 74 in the strip 71. The screw 76 may be self-tapping, or the holes 74 in the strip 71 may be pre-tapped or threaded. As will be appreciated, a similar coupling arrangement may be used at each end of each of the rails 31 and 32 forming the base structure of the upper cabinet structure 11. The planar lower surfaces of the portions 43, 44 and 48 of each of the rails 31 and 32 (see FIG. 4) define a stable base on which the cabinet structure may be supported on a horizontal plane surface, such as on the top panel 28a of structure 11a.

As will be appreciated, the coupling elements 69 described above in detail with reference to FIGS. 7 and 8 provide a means whereby cabinet groups such as the groups 10, 13, 14, 16, 10a, 13a and 14a can be readily built up from modular cabinet structure such as the structure 11, 17 or 18 described above in detail with reference to FIGS. 1 to 6, having each structure secured to the vertically adjacent structure whereby a stable built-up group is obtained.

In order the close off the base of the cabinet structure, and provide a complete enclosure and a neat appearance, a thin rectangular bottom panel 77 is preferably inserted into the cabinet structure and placed over the rails 31 and 32. The panel 77 is of length such that it abuts snugly against the upper portions 57 of the inclining sides 39 of the rails 31 and 32, and of width such that it fits snugly between the side panels 26 and 27. Its thickness is such that it rests on web 36 with its upper surface flush with lip portion 57.

Doors such as side-opening cabinet doors 21 seen in FIG. 1 can be hinged to the cabinet structure using conventional hinges connected to the inner faces of the side panels 26 and 27. Upwardly opening doors, such as a door 78 indicated in FIG. 1 may similarly be hinged to the underside of the top panel 28. Shelving 19 as seen in FIG. 1 can be connected to the inner sides of the side panels 26 and 27 with conventional shelf supports.

Similarly, conventional drawer slide mechanisms can be connected to the inner sides of the inner panels 26 and 27 for supporting drawer slides, hanging folder slides.

Figure 9:
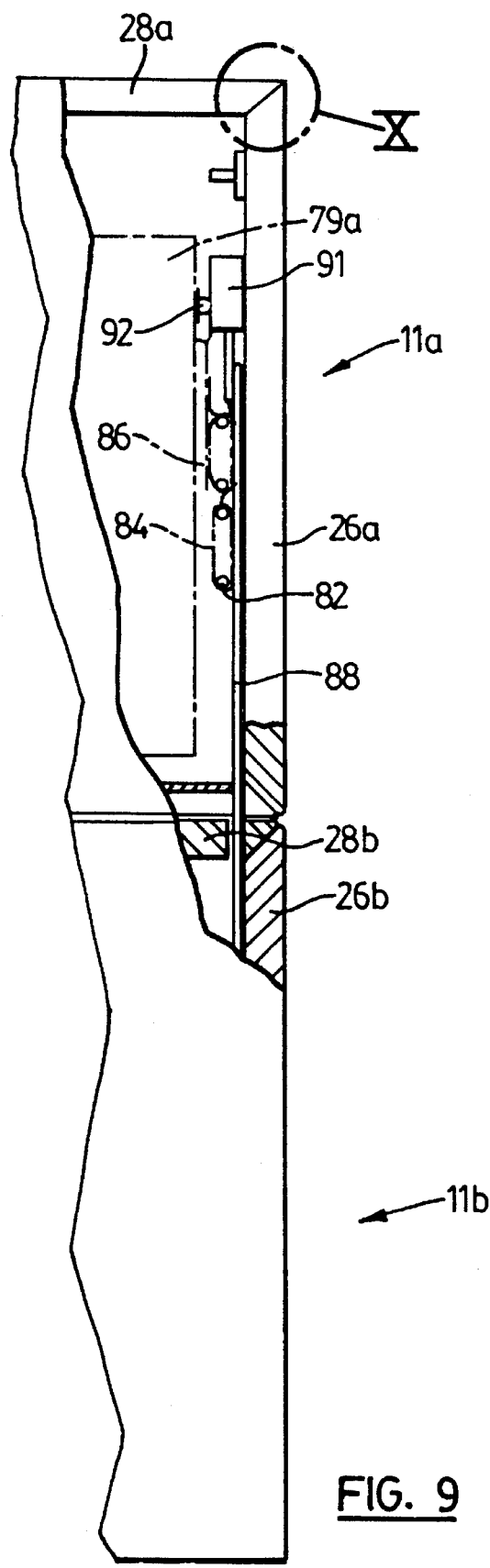
FIG. 9 is a rear view partially in section showing two vertically adjacent cabinet structures each equipped with a sliding drawer and with a drawer interlock arrangement.
Figure 11:
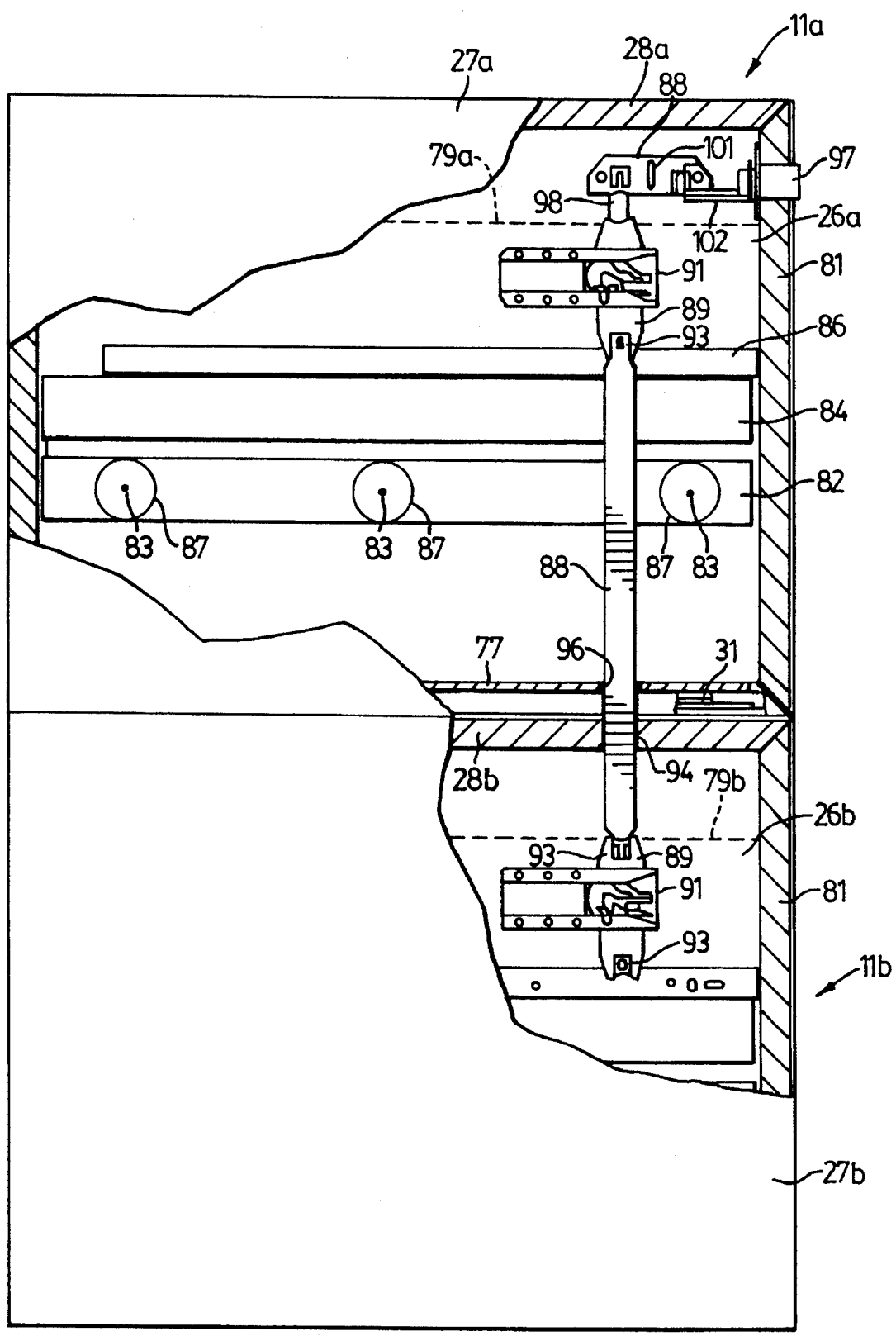
FIG. 11 is a side view partly in section of the cabinet structure, drawers and interlock of FIG. 9.

FIGS. 9 and 11 show a drawer slide system provided with an anti-tilt interlock. In the example shown, upper and lower units, 11a and 11b are preferably interconnecting with coupling elements 69 as described in detail above with reference to FIGS. 7 and 8. Each unit contains a drawer 79a or b having a front wall 81 with edges bevelled so that when the drawer is closed the wall 81 is snugly received against the bevelled front side edges of the top panel 28a or 28b, the bevelled front edges of the side panels 26a or 26b and 27a or 27b and the inclined front edge 39 of the front rail 31.

Each drawer 79a or b is supported on each side on a full extension drawer slide comprising a cabinet rail 82 attached to the inner wall of the adjacent side panel, for example panel 27, with fasteners such as screws at three points 83. An intermediate or floating rail 84 runs on the cabinet rail on ball bearings, and a drawer rail 86 supporting the drawer 79a or b runs on the intermediate rail 84, again on ball bearings. The cabinet rail is spaced from the panel 27 or other panel to which it is attached, by circular spacers or washers 87 sufficiently to allow a thin interlocking bar 88 to reciprocate freely upwardly and downwardly. The bar 88 is adapted to actuate an anti-tilt interlocking device, and passes between two of the spacers 87, as seen in FIG. 11.

At each end, the bar 88 connects with latching mechanism forming part of the above-mentioned anti-tilt device and comprising a locking device 89 vertically reciprocable on a housing 91 secured to the side wall 27. The device 89 contains a catch operable to engage a projection and actuator 92 secured to the drawer 79a or b, when the bar 88 and devices 89 are displaced, for example are raised, and thereby prevent extension of the drawer 79a or b. Normally, when the bar 88 is in a lower position, when a drawer such as drawer 79a or b is extended, as the projection or actuator 92 moves forwardly from the fully closed position, it strikes the catch and this raises the locking devices 89 and the bar 88. The catch then latches the devices 89 and bar 88 in the raised or locked state. In such state, the bar 88 has moved the catch associated with the other drawer (and with every other drawer connected or ganged together in the vertical stack) to a position effective to interfere with the projection 92 on the or each other drawer so that no other drawer in the stack can then be opened. This anti-tilt interlock serves to prevent overbalancing as a result of the forward shift of the center of gravity which could occur if two or more drawers were extended at the same time. In the preferred form of the present invention, a form of anti-tilt interlock is selected which has its bar 88 detachable at each end from the devices 89. Preferably, the bar 88 has snap-coupling formations 92 which snap-couple with corresponding formation 93 provided on the devices 89. Such anti-tilt interlock mechanisms having detachable interlocking bars are in themselves known for use in monolithic filing cabinets consisting of a single cabinet frame provided with a number of sliding drawers, and are available under the trade-mark HETTICH from Hettich Marketing-Und Vertriebs-GmbH & Co. Kg., Kirchlengern, Germany. To enable installation of such anti-tilt mechanisms in vertically stacked modular cabinet structures in accordance with the invention, each upper panel 28 is formed with a thin rectangular slot 94 on at least one side, and preferably on both sides, as seen in FIG. 3, so that an anti-tilt interlocking mechanism can be installed on each side of the stack of cabinets. Similarly slots may be formed by each bottom panel 77 at positions 96 in registry with the slots 94.

In use, the stack or group of cabinets such as stack 10 is set up having the anti-tilt mechanism installed except for the locking bar 88 or plurality of bars 88 in the event that the stack is more than two high. A bar 88 is then inserted into an upper cabinet, for example, such as structure 11a, passed downwardly between the cabinet rail 82 and the adjacent side panel 27 and through the slots 96 and 94 and its end then snap-coupled with latching mechanism 89 in the sub-adjacent cabinet, for example structure 11b, using finger pressure to snap the coupling portions together. The upper end of the bar 88 can then be snap-coupled to the upper latching mechanism 89.

In the example shown, the anti-tilt mechanism cooperates with a cabinet lock 97. A short upper bar extension piece 98 connects the upper locking device 89 to a locking plate 99 supported for vertical sliding on a pin 101 attached to the side panel. When a key is inserted in the lock 97 and turned, a lock extension 102 lifts the plate 99 thus raising all locking devices 89 and bars 88 to the locking state, precluding extension of any drawer such as drawers 79a and b.

Figure 10:
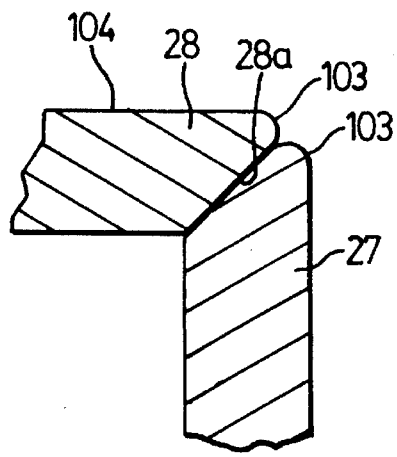
FIG. 10 is a cross section on an enlarged scale of the area circled at X in FIG. 9.

Referring to the enlarged section seen in FIG. 10, it may be noted that the outer corner edges of the bevelled edges of the panels, such as the top panel 28 and side panel 27, are formed similarly with a convexly arcuate profile 103 blending smoothly with the outer surfaces of the panel such as upper planar surface 104 and the adjacent chamfer or bevelled edge 28. This avoids edges which would be sharp or thin and vulnerable to damage, and provides as aesthetically attractive appearance of an inset edge or reveal line bordering each side of the cabinet structure.

As seen in FIG. 4, the front edge of the foot portion 44 of the rail section 33 used for the front and rear rails 31 and 32 is also convexly rounded similarly to the edge portion 103, so that the exposed edge of the rear rail 32, visible beneath the back panel 29, and the edge of the front rail 31 visible beneath any door or the like such as drawer front 81 present an appearance similar to the edges of the panels 26 to 29.

Figure 12:
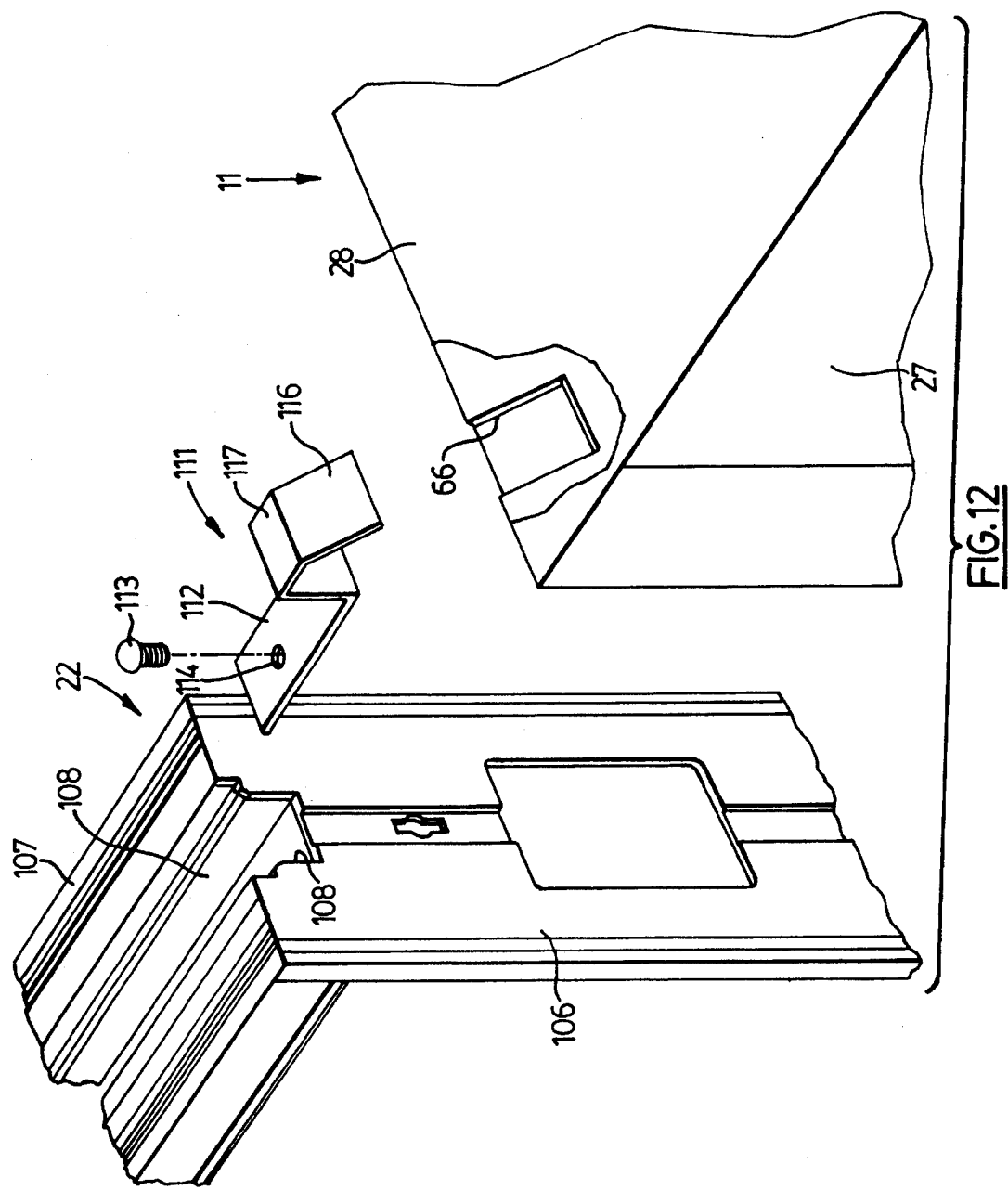
FIG. 12 is a partial perspective view, again with portions cut away, and on an enlarged scale, of the area circled at XII in FIG. 1, showing a device for coupling cabinet structure of the invention in parallel position to partition wall structure.
Figure 13:
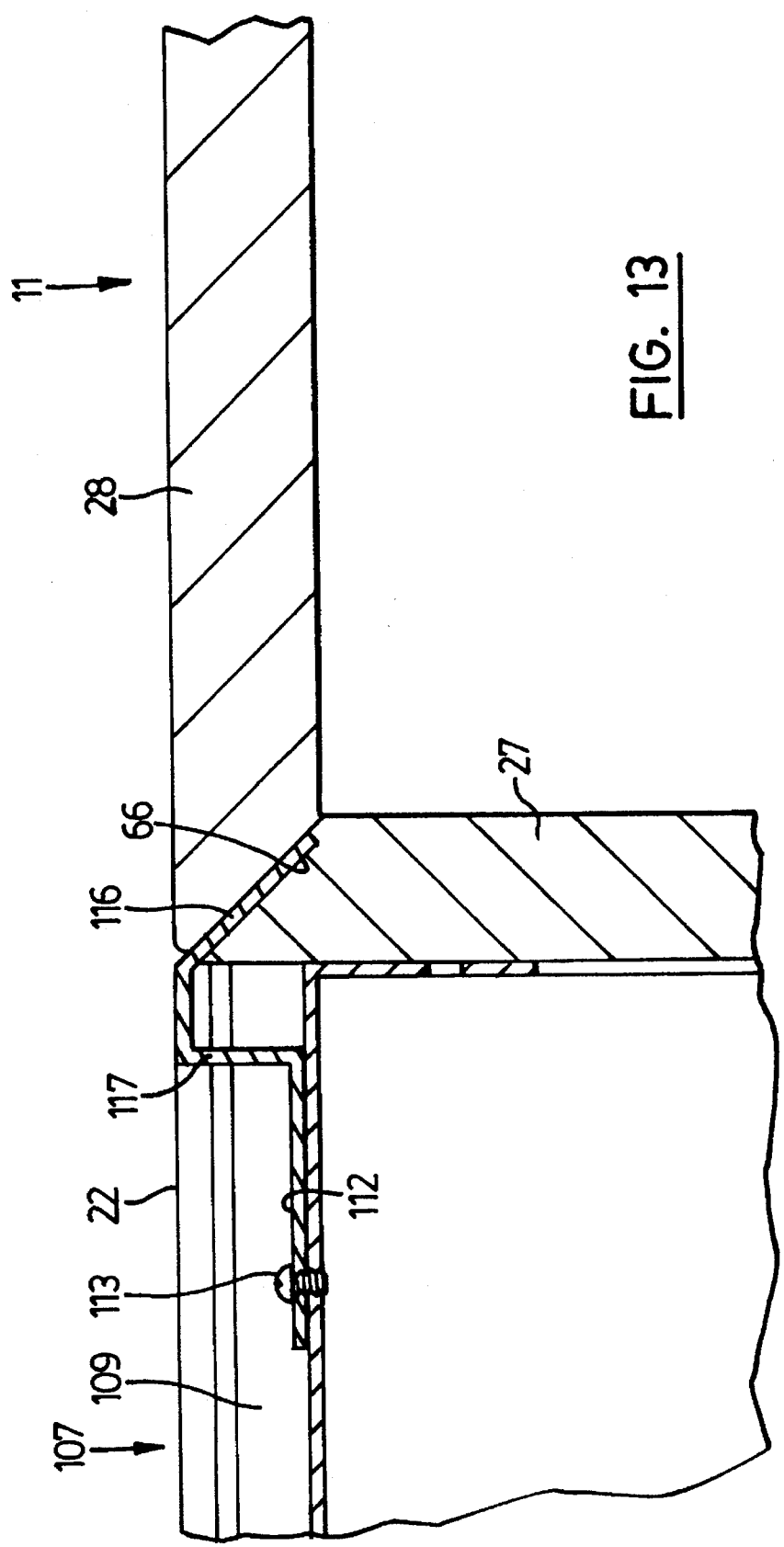
FIG. 13 is a partial cross-section taken through the assembled structure of FIG. 12.

FIGS. 12 and 13 show an arrangement for coupling the cabinet structure parallel to a partition wall, wherein the structure 11, may for example form part of a group of cabinets 10 as seen in FIG. 1 coupled to a partition element 22, so that the group 10 supports and stabilizes the wall 22. In the example shown, the partition element 22 comprises rectangular frame elements similar to those described and shown in applicant's above-mentioned U.S. Pat. No. 4,905,428. The elements 22 comprise a vertical side rail 106 united at its upper end to a generally channel section upper rail 107. The upper end of the side rail 106 is notched at 108 to expose the end of the channel recess 109. The coupling element comprises a rigid rectangular metal plate member 111 comprising a rectangular base portion 112 adapted to be secured in the base of the channel 112 with a self-tapping screw 113 passed through an opening 114 as seen in FIG. 12. An inclining rectangular tab portion 116 of the coupling element, which fits snugly within the opening 68 and recess 66 adjacent the rear edge of the cabinet 11, is connected to the portion 112 through an upwardly raised supporting portion 117 in order to conform the coupling element to the cabinet structure 11 and frame element 22, since normally it is desired that the height of the cabinet structure 11 or of a stack or group of modular cabinet structures 10 placed one on top of another, of which the cabinet structure 11 is uppermost, should be the same as the height of the frame element 22, as seen in FIG. 1.

Figure 14:
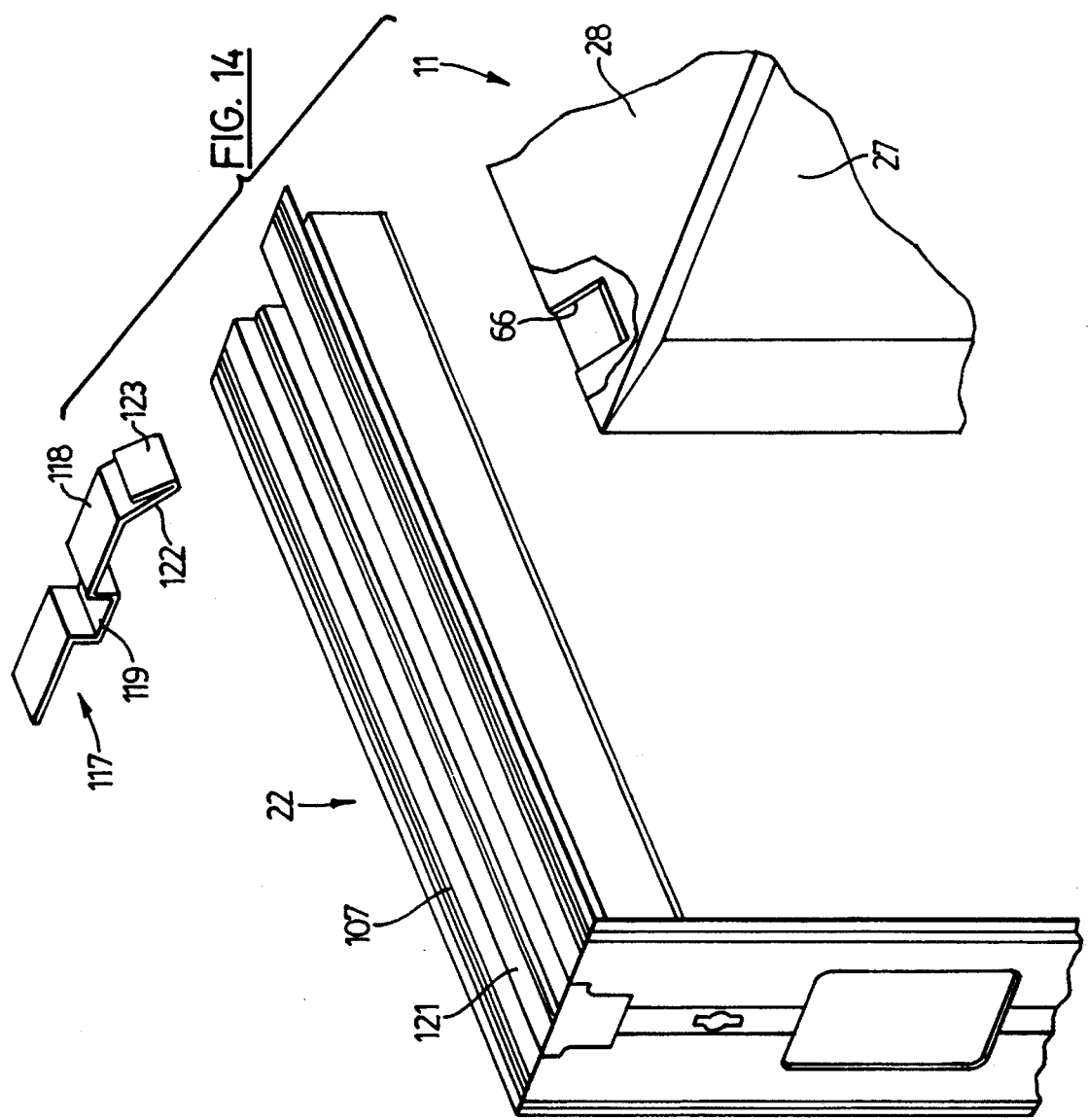
FIG. 14 is a partial perspective view, again with portions cut away, and on an enlarged scale, of the area circled at XIV in FIG. 2, showing an arrangement for coupling cabinet structure of the invention at right angles to partition wall structure.
Figure 15:
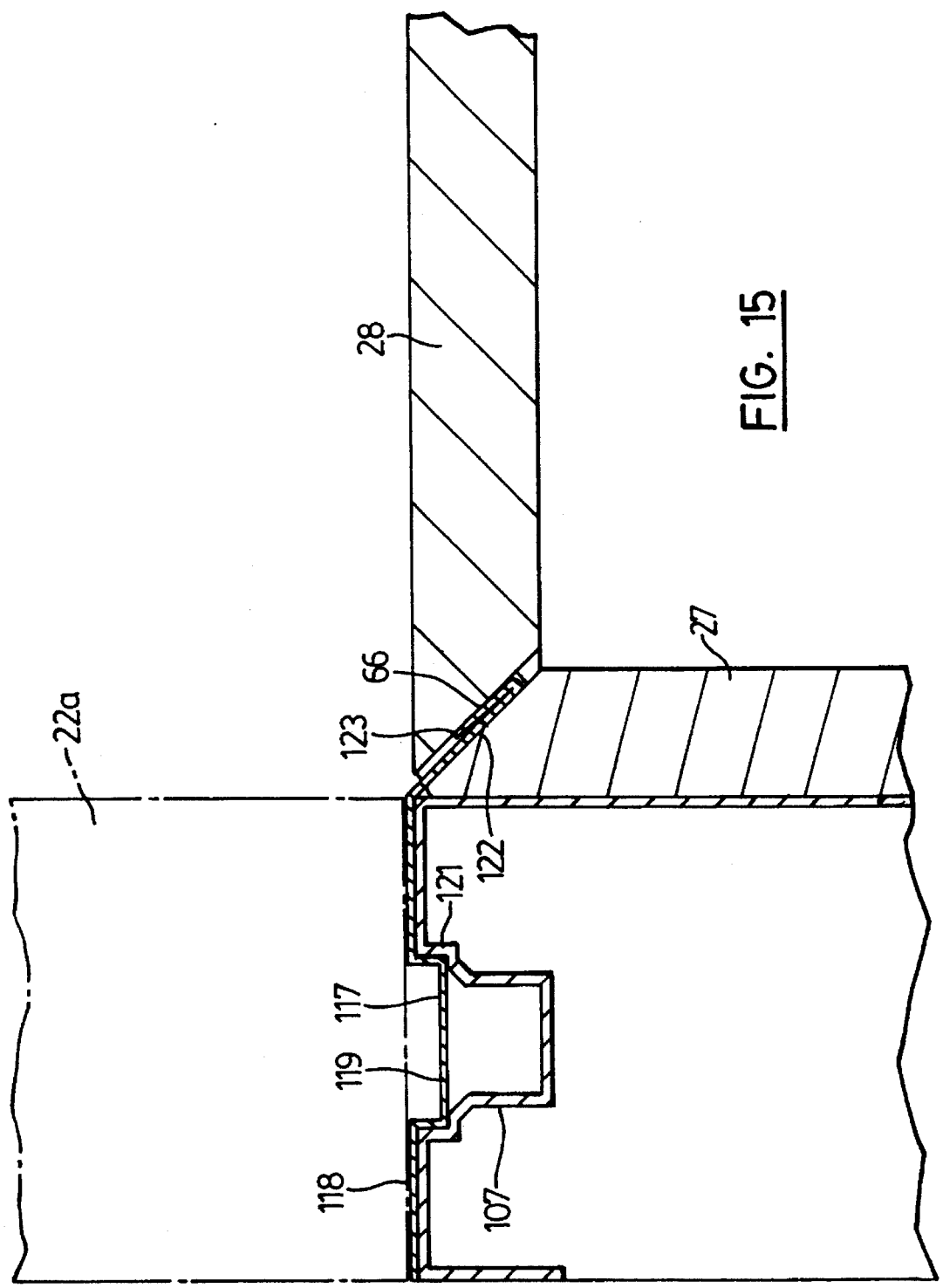
FIG. 15 shows a partial cross-section through the structure of FIG. 14 in assembled condition.

FIGS. 14 and 15 show a somewhat similar coupling arrangement for supporting a wall where it is desired to provide a cabinet structure 11 extending at right angles to a frame element 22 of a partition wall, for example as seen for the group 10a in FIG. 2. In this case, a relatively thin resilient metal coupling element 117 is employed. The element 117 has a rectangular plate portion 118 with a downwardly off-set channel section portion 119 adapted to lodge in an upper relatively wide channel section portion 121 of the rail 107, as seen in FIG. 15.

The element 117 has an inclining rectangular tab portion 122 including a portion 123 bent rearwardly and in effect forming a barb. In use, the portions 122 and 123 are inserted into the opening 68 and recess 66. The barbed portion 123, in the relaxed condition, extends away from the portion 122, and is compressed downwardly, as seen in FIG. 15, so that the free edge of the barbed portion 123 engages in the material of the top panel 28 as a result of the resilient reaction and resists withdrawal. If desired, a thin bladed tool may be introduced to depress the barb 123 to allow retraction of the element 117 for the purpose of disassembly. As noted above, the coupling element 117 is formed of relatively thin plate material, and may be retained and located relative to the rail 107 by compression between the rail 107 and a vertically adjacent element 22a of the partition wall in the event the wall 22 extends above the top of the group of cabinets 11 as shown in broken lines in FIG. 15, or by a planar capping plate 124 (seen in FIG. 2) disposed over the element 117 and secured to the rail 107, for example as described in applicants above-mentioned U.S. Pat. No. 4,905,428, especially with reference to FIGS. 8a and 8b thereof, in the event the top of the cabinet 11 is to be flush with the top of the wall 22. The element 22a may be a further frame element similar to the frame element 22 having its lower rail retained to the rail 107 through vertical connectors applied at points spaced longitudinally from the coupling element 117 for example as described in applicants patent application Ser. No. 08/173,257 with reference to FIGS. 4 and 5 thereof. As will be appreciated, usually at least two of the coupling elements 117 will be used to couple an upper corner edge of each cabinet structure 11 to an adjacent partition wall such as element 22.

Figure 17:
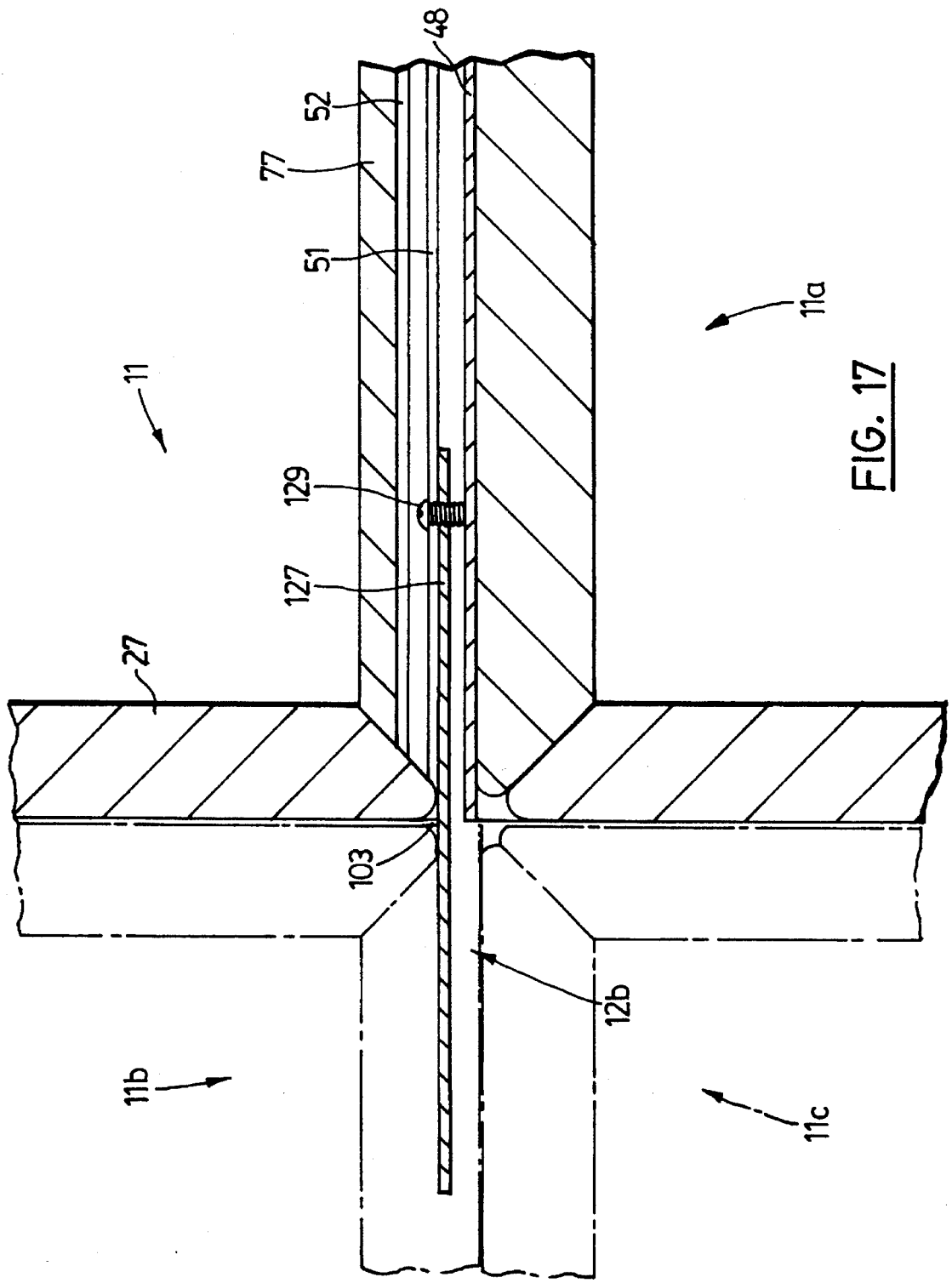
FIG. 17 is a partial cross-section taken through the assembled structure of FIG. 11.

FIGS. 16 and 17 show an arrangement for making lateral connections between cabinet structure 11, or banks or groups such as groups 13, 14 and 16 of vertically stacked structures 11, 17, 18 or 21. The connector member 126 comprises a substantially rigid or stiff rectangular plate 127, for example a steel strip of width to fit snugly within the lower upwardly facing channel 47 in the rails 31 and 32. Adjacent each end of plate 127, an opening 128 is formed in which screws 129 can engage. The screws 129 may be self-tapping or the openings 128 may be pre-tapped. When the screws 129 are threaded fully into the openings 128, the ends of the screws 129 engage on the base of the channel formed by the lower web 48, so that the plate 127 is urged tightly upwardly into engagement with the underside of the re-entrant sides 51 and 54 of the channel 47. That is to say, the plate 127 is in the upper position shown in FIG. 17. Normally, each cabinet structure 11 is supplied with a plate 127 in each rail 31 and 32 in a retracted condition wherein its ends are disposed inwardly from the ends of the rail 31 and 32. In order to connect neighbouring cabinet structures, the screws 129 are loosened, and the plate 127 pushed longitudinally of the rail 31 or 32 to an extended position, as seen in FIGS. 16 and 17, wherein one end of the plate 127 enters the open end of the channel 47 of the rail 31b or the like of the adjacent cabinet structure 11b. The screws 129 at each end of the plate 127 can then be tightened to locate the plate 127 within the adjoining rail structures 31 or the like. This arrangement allows laterally adjacent cabinet structures such as structures 11, 17 17a or 18 to be joined structurally together to form a unitary wall or bank of cabinets, having increased stability against tipping and the like.

In the assembled condition, the rails 31 and 32 extend below the lower edges of the side walls 26 and 27. As seen in FIG. 17, for example, the plane of the lower web 48 extends below the rounded edge 103, providing a clearance through which the plate 127 can be extended or retracted.

Figure 18:
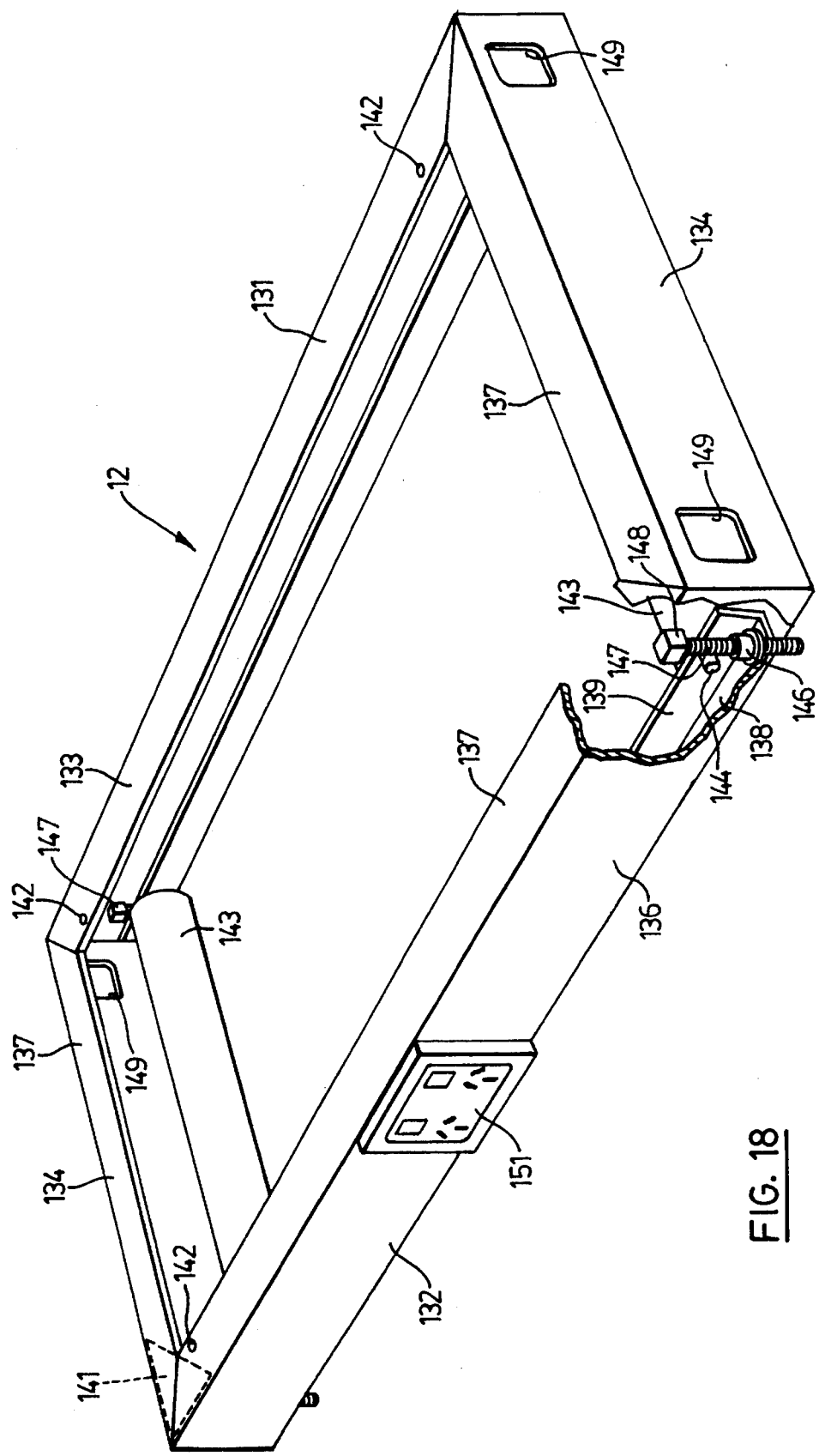
FIG. 18 is a perspective view of a base unit for the cabinet structure.

FIG. 18 shows one preferred form for the supporting base 12, comprising a rectangular frame 131 formed from front and rear pieces 132 and 133 and end pieces 134. Each of these pieces is generally of channel section with the channel facing inwards. Each front and rear piece 132 and 133 comprises a vertical web portion 136, an upper flange 137, a lower flange 138 somewhat shorter than flange 137, and an inner lip 139 upstanding from the inner edge of the lower flange 138.

Each side piece 134 is somewhat similar in section to the front and rear pieces 132 and 133 except it has no upstanding lip such as lip 139. The pieces 132, 133 and 134 abut at mitered corners and are rigidly connected with triangular connector plates, the position of one of which is indicated in broken lines at 141 in FIG. 18, spanning beneath the upper flanges 137 at each corner and spot welded to the under sides of the flanges 137.

The supporting base 12 is formed to be the same size as the base of the cabinet such as structure 11, to be supported. The outer faces of the side pieces 132, 133 and 134 are flush with the front, sides and back of the structure 11. In use the rails 31 and 32 rest on and are parallel to the upper flanges 137 of the front and rear pieces 132, 133. Desirably, each piece 132 and 133 is formed with an opening 142 adjacent each end and positioned to be engaged by a screw passed through the opening 75 pre-drilled adjacent each end of each rail 31 and 32, in order to anchor the lowermost cabinet structure 11 of a stack or group on the base 12. In order to facilitate moving a cabinet structure or group of cabinet structures, the base 12 is provided with ground-engaging roller members, preferably a pair of rollers 143. Each roller 143 is journalled on an axle 144 supported in a bearing passing through the lip 139 adjacent one end. The diameter of the roller is sufficient to extend a small distance below the lower edge of each side piece 132, 133 and 134, so that each roller can engage the ground or floor to allow rolling motion. A threaded bushing 146 is fixed in each lower flange 138 adjacent each end and somewhat outwardly from the bearing of the adjacent axle 144. A jacking mechanism in the form of an elevating bolt 147 is threaded in each bushing 146, and has a tool engaging square or hexagonal head 148 which can be accessed with wrench or similar tool introduced through an opening 149 provided through each end piece 134 adjacent each of its ends. After installation of a cabinet or cabinet group, the bolts 147 are turned to extend them downwardly relative to the bushings 146 to engage and react with the ground or floor and elevate the frame 12 sufficiently to space the rollers 143 above the floor. When desired, the bolts 147 can be turned to retract them above the lowermost point of the rollers to allow the rollers 143 to again contact the floor for the purpose of moving the base 12 together with the cabinet structure or structures supported on the base 12 to a fresh position.

Preferably, at least one of the side pieces of the base 12 is formed with an opening or a partially pierced knock out which can be easily removed to form an opening suitable for mounting an electrical receptacle box. In FIG. 18 a receptacle box 151 is shown mounted in an opening in the front piece 132. The box 151 is used with an approved connector allowing an electrical connection to be made, before cabinet structures 11 are placed on the base 12, to power the box 151 from a floor receptacle. In this way the base can be positioned over a floor receptacle without reducing the availability of power outlets.

As noted above, in the assembled cabinet structure, the bevelled face 39 of the rear rail 32 faces rearwardly to engage snugly against the lower bevelled edge 292 of the back panel 29. Normally, the connections between the back, top and side panels 26 to 29 made through the angle bracket connector members 34, together with the connection between the side panels 26 and 27 and the rails 31 and 32 provides sufficient structural rigidity and strength to the cabinet structure 11. If desired, however, the rear rail 32 may be connected to the lower edge of the back panel 29 by means of screws (not shown) passed upwardly from the underside of the inclining portion 39. The angled cross-sectioned groove 59 formed by the enlarged portion 48 described in more detail above with reference to FIG. 4 serves to locate the tips of the screws as they are passed upwardly through the portion 39 and into the lower edge of the back panel 29.

I claim:

1. Cabinet structure coupling to a superadjacent similar cabinet structure, each such cabinet structure comprising interconnected side, top and back panels, and base structure comprising a downwardly facing channel connected at least to the side panels, the side and top panels having interengaging bevelled edge surfaces, and at least one channel section recess formed in at least one of said bevelled edge surfaces and extending outwardly to define an opening on an outer corner edge of the cabinet structure, and, in combination therewith, a coupling member connecting to the base structure of said superadjacent cabinet structure and having a rectangular tab portion inserted in said opening and an elongated web portion seating in said downwardly facing channel of said superadjacent similar cabinet structure and said tab portion inclining generally longitudinally away from one end of said web portion generally toward an opposite end thereof.

2. Cabinet structure as claimed in claim 1 wherein said base structure comprises at least one channel section rail extending transversely between said side panels.

3. Cabinet structure as claimed in claim 2 wherein said channel section rail has bevelled end surfaces interengaging bevelled edge surfaces of the side panels and each end of said rail is connected to the adjacent side panel by an angle bracket connector having one portion inserted in a slot formed in the bevelled edge of said adjacent side panel and another portion inserted in a channel of said rail.

4. Cabinet structure as claimed in claim 2 including a plate sliding longitudinally in said rail from a retracted position to an extended position for engagement in a rail of an adjacent similar structure.

5. Cabinet structure as claimed in claim 4 including a fastener for locating the plate in the rail in the extended position.

6. Cabinet structure as claimed in claim 1 wherein said coupling member comprises a limb extending from said opposite end of said web portion generally toward said tab portion for engaging a top panel of the cabinet structure.

7. Cabinet structure as claimed in claim 1 including a mechanical fastener adapted to locate said coupling member relative to said base structure.

8. Cabinet structure as claimed in claim 1, wherein said downwardly facing channel extends laterally between the side panels and receives a plate sliding longitudinally of the channel from a retracted position to an extended position engaging in the channel of a similar adjacent cabinet structure.

9. Cabinet structure as claimed in claim 8 including a fastener for locating the plate in the channel in the extended position.

10. Modular sliding drawer cabinet structure comprising at least an upper and a lower modular cabinets adapted to be stacked vertically with said upper on said lower cabinet, each cabinet having two sides, a back, a top and base structure, each side having an inner face, and a front connected to a sliding drawer suspension connected to each of said inner faces, an anti-tilt mechanism associated with at least one sliding drawer suspension of each cabinet, and an actuating bar interconnecting the anti-tilt mechanism and disallowing extension of the suspension of one of said cabinets when the suspension of the other of said cabinets is extended, and wherein the top of at least the lower cabinet has an opening through which the bar passes and each end of the bar is adapted to couple releasably to each anti-tilt mechanism.

11. In combination, rectangular cabinet structure and a rectangular base supporting the structure and provided with roller members normally engaging the ground beneath the base for rolling motion, and associated with each roller member a jacking mechanism actuatable to elevate the base sufficiently to disengage each roller member from the ground wherein the base has a periphery defined by a rectangular frame comprising a pair of parallel end members and a pair of side members at right angles to the end members, and said roller members comprise a pair of cylindrical rollers extending horizontally parallel to and adjacent said pair of end members, respectively, each roller member having a length substantially the length of the adjacent end member and journalled at its opposite ends on said side members, respectively.

12. The combination of claim 11 wherein each jacking mechanism comprises a bolt threadedly engaging the base and extendable downwardly.

13. Cabinet structure coupling to a rectangular frame element having a channel section member, said cabinet structure comprising interconnected side, top and back panels, and base structure connected at least to the side panels, the side and top panels having interengaging bevelled edge surfaces, and at least one channel section recess formed in at least one of said bevelled edge surfaces and extending outwardly to define an opening on an outer corner edge of the cabinet structure, and, in combination therewith, a coupling member comprising a rectangular tab portion inserted in said opening and an elongated rectangular member to be secured longitudinally within the channel of said channel section member, said rectangular tab portion inclining longitudinally away from said rectangular member.

14. Cabinet structure coupling to a rectangular frame element having a channel section member, said cabinet structure comprising interconnected side, top and back panels, and base structure connected at least to the side panels, the side and top panels having interengaging bevelled edge surfaces, and at least one channel section recess formed in at least one of said bevelled edge surfaces and extending outwardly to define an opening on an outer corner edge of the cabinet structure, and, in combination therewith, a coupling member comprising a rectangular tab portion inserted in said opening and a channel section portion secured laterally within the channel of said channel section member, and said rectangular tab portion inclining laterally from said channel section portion.

* * * * *

UNITED STATES PATENT AND TRADEMARK OFFICE
CERTIFICATE OF CORRECTION

PATENT NO. : 5,486,041
DATED : January 23, 1996
INVENTOR(S) : Christopher C. Sykes It is certified that error appears in the above-identified patent and that said Letters Patent are hereby corrected as shown below:

On the Cover Page, delete "[73] Assignee: International Fuel Cells Corporation, South Windsor, Conn."

Signed and Sealed this

Sixth Day of May, 1997

Attest:

Attesting Officer

BRUCE LEHMAN
Commissioner of Patents and Trademarks